Feb. 11, 1930.     H. C. MORRIS     1,747,123
SAWMILL
Filed Sept. 26, 1927     5 Sheets-Sheet 1
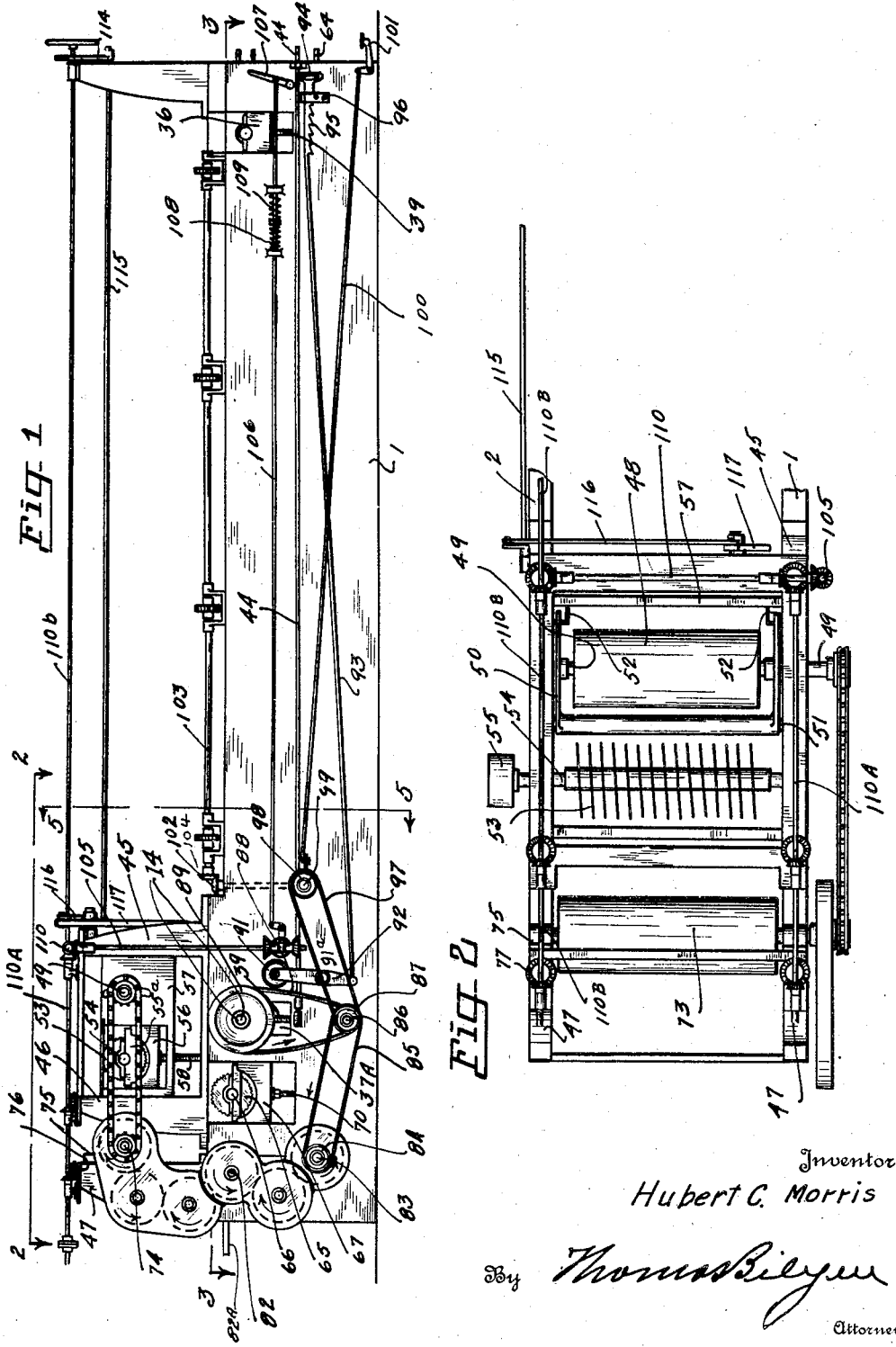
Inventor
Hubert C. Morris
By Thomas Bilyeu
Attorney

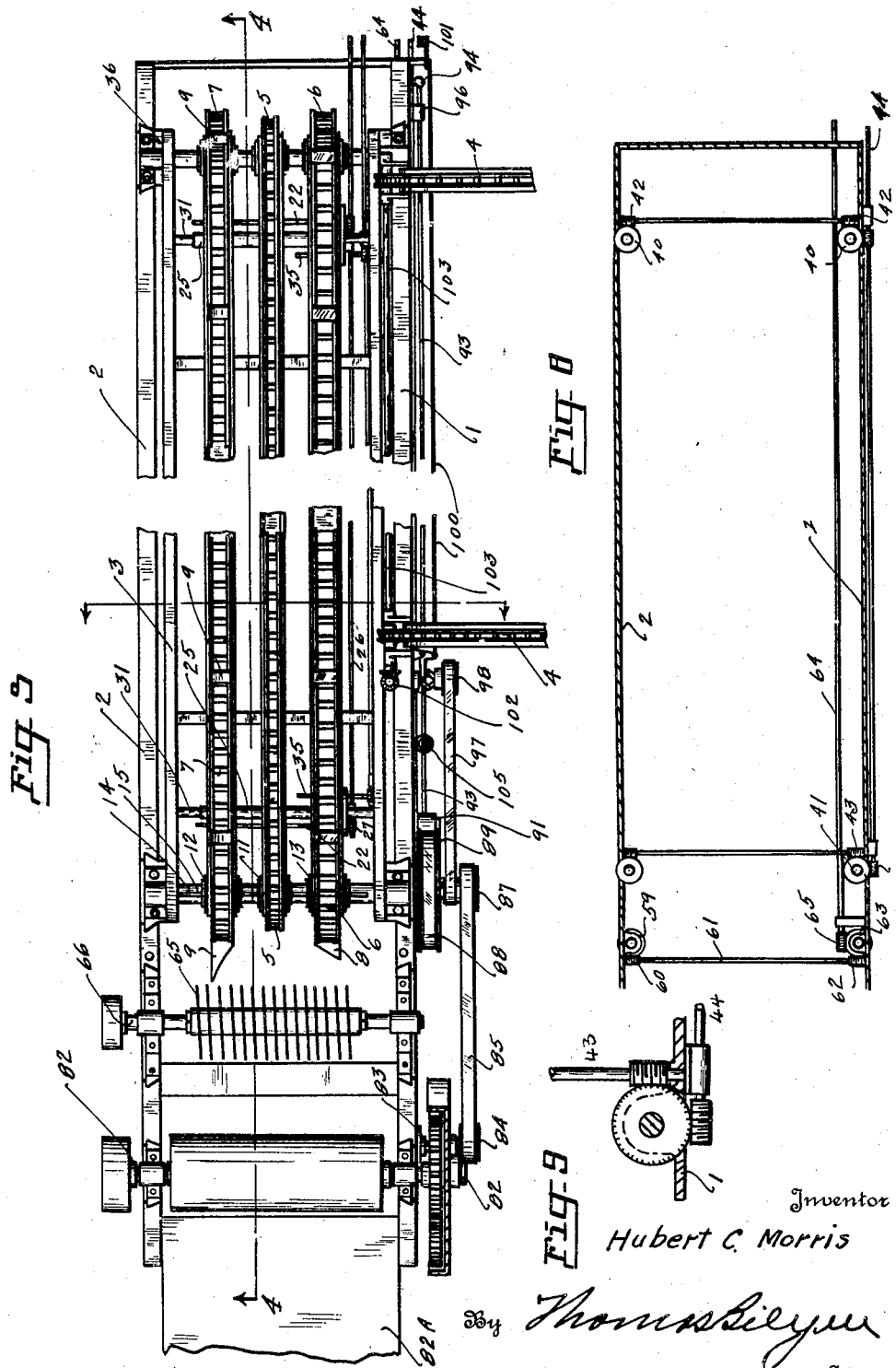

Feb. 11, 1930.                H. C. MORRIS                    1,747,123
                                SAWMILL
                          Filed Sept. 26, 1927         5 Sheets-Sheet 3
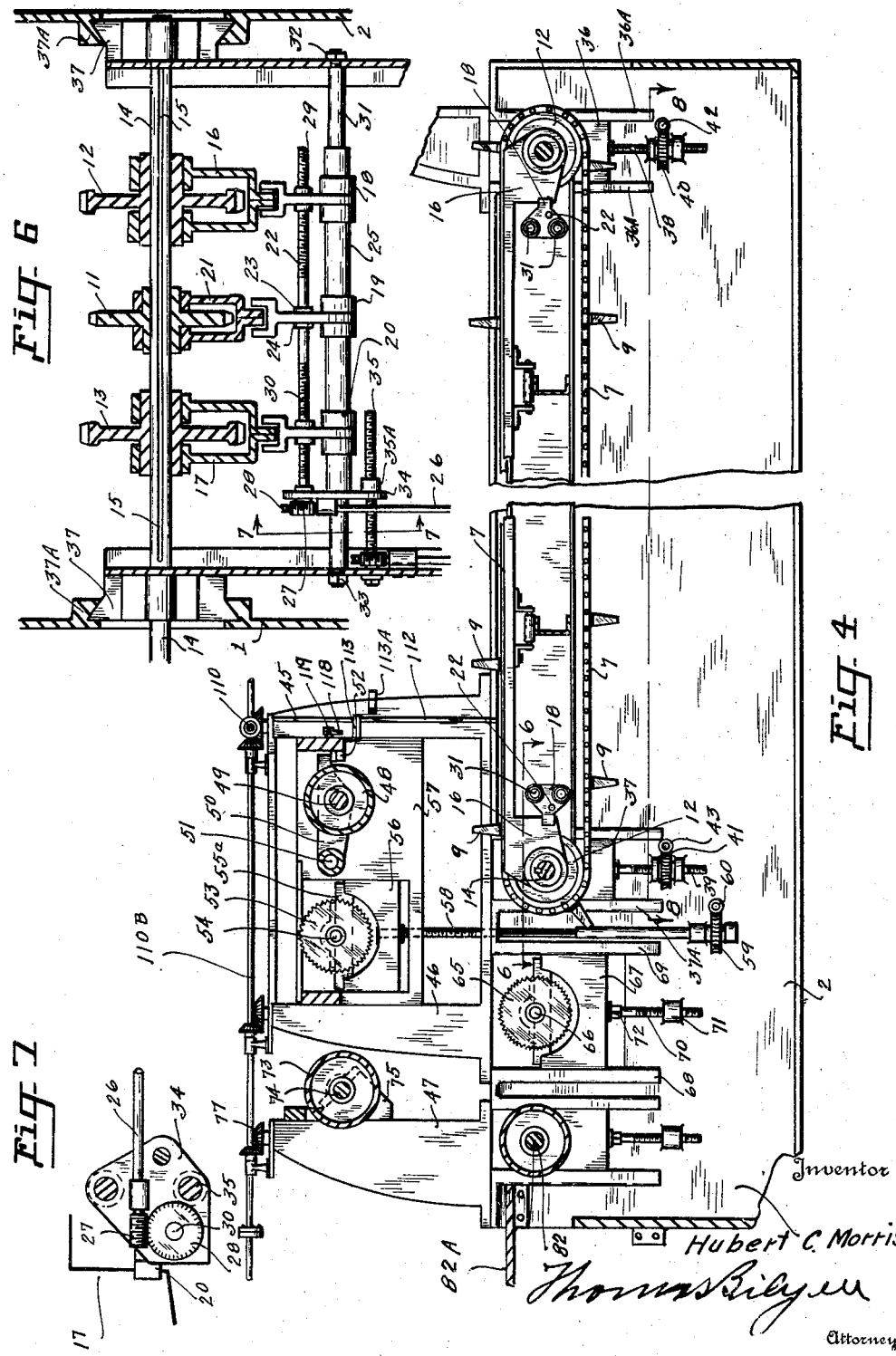

Feb. 11, 1930.       H. C. MORRIS       1,747,123
SAWMILL
Filed Sept. 26, 1927     5 Sheets-Sheet 4
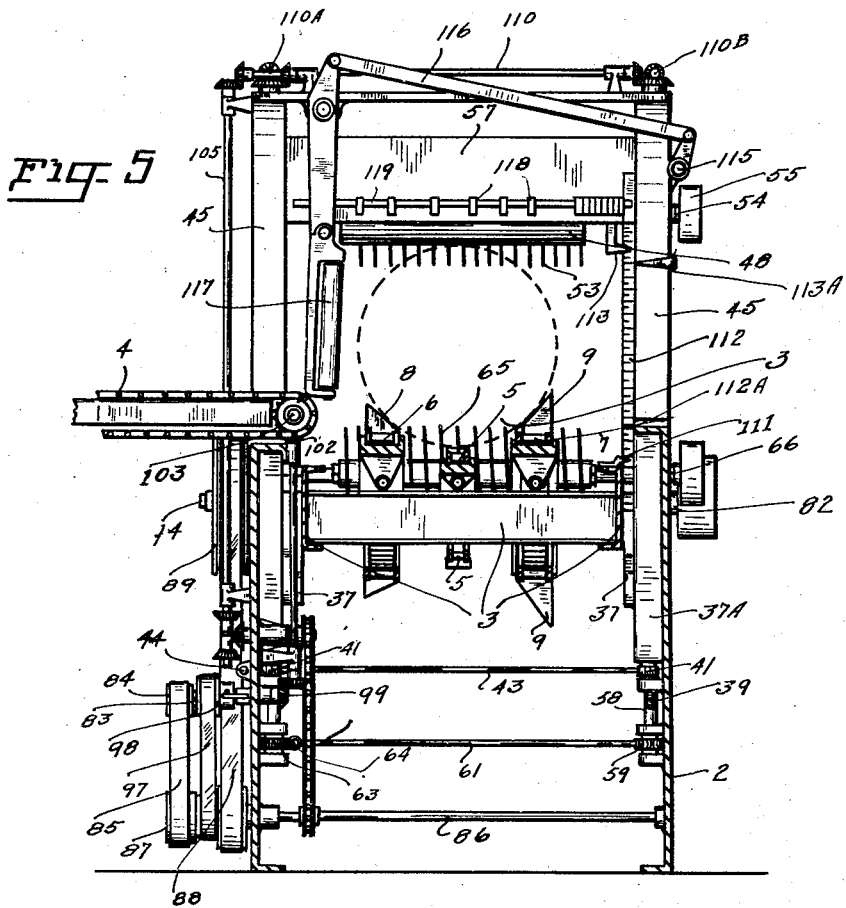
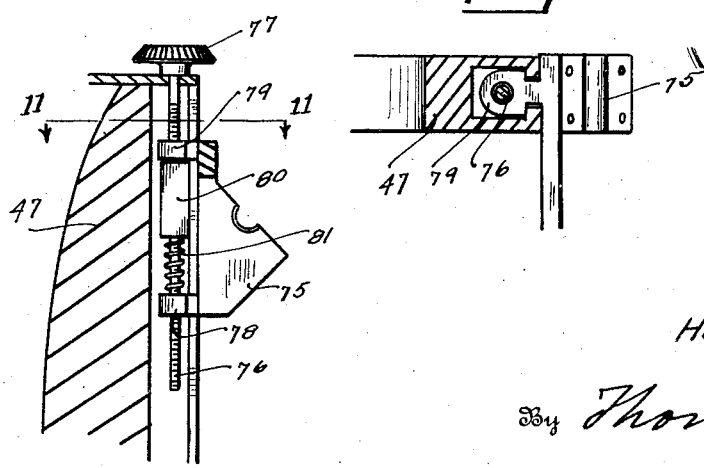
Inventor
Hubert C. Morris
By Thomas Bilyeu
Attorney Feb. 11, 1930.  H. C. MORRIS  1,747,123
SAWMILL
Filed Sept. 26, 1927    5 Sheets-Sheet 5

Inventor
Hubert. C. Morris
By
Attorney

Patented Feb. 11, 1930

1,747,123

UNITED STATES PATENT OFFICE

HUBERT C. MORRIS, OF ALBANY, OREGON

SAWMILL

Application filed September 26, 1927. Serial No. 222,082.

My invention relates to improvements in saw mills wherein the same is adapted for use in preparing logs of relatively small diameter for sawing of the same into boards or dimension materials after the same has passed through my new and improved saw mill. The same consisting primarily of a carriage and means for the reducing of oppositely disposed sides of the log to a comminuted state to form parallel sides, means being provided for the raising and lowering of the table relative to that of the sawing heads and feeding rolls adapted to engage the upper side of the log. Means being further provided for predetermining the path of travel of the treated log after the same has passed through my new and improved mill.

In the present treatment of logs, the handling of the slabs and waste material is many times a burden preventing the economical handling of mills sawing small logs and it is my purpose to reduce the oppositely disposed sides of the log to a comminuted state in order that the same may be handled or transmitted by conveyor or suction or blower means, thus eliminating the necessity of handling of the slabs by hand.

A further object of my invention consists in providing simple and efficient means for the receiving of the log upon the carriage and for positioning the same in advance of its passage through the sawing heads by having control levers adapted for manipulation by the operator of the device being positioned at one end of the receiving carriage upon which the logs to be treated are received.

Still further objects of my invention consist in providing feeding rolls adapted to being manipulated by the operator of the mill from a remote control lever system and having arbors upon which wabble saws are disposed that are adapted to being positioned by the operator of the mill by remote control lever systems that are power actuated; means being further provided for actuating the feed rolls and the cutter heads each independent of the other.

Through the operation of my device in conjunction with a standard gang edger, I have invented a new and useful method of sawing tapered logs and other logs of relatively small diameter in which I remove the top and bottom of the log to create a cant having oppositely disposed flattened sides that are parallel with each other and then pass the log through a standard edger and cut dimension material in parallel strips that are preferably cut parallel to the slope of one of the tapering sides of the log.

With these and incidental objects in view, the invention consists in certain novel features of construction and combination of parts, the essential elements of which are set forth in the appended claims, and a preferred form of embodiment of which is hereinafter shown with reference to the drawings which accompany and form a part of this specification.

In the drawings:—

Fig. 1 is a side elevation of my assembled device.

Fig. 2 is a top, plan, view, taken on line 2—2 of Fig. 1, looking in the direction indicated.

Fig. 3 is a sectional, top, plan view, taken on line 3—3 of Fig. 1, looking in the direction indicated.

Fig. 4 is a sectional, side, elevation, taken on line 4—4 of Fig. 3, looking in the direction indicated.

Fig. 5 is a cross section view, taken on line 5—5 of Fig. 1, looking in the direction indicated.

Fig. 6 is a fragmentary, enlarged, sectional, plan view, taken on line 6—6 of Fig. 4, looking in the direction indicated.

Fig. 7 is a fragmentary, cross sectional, view, taken on line 7—7 of Fig. 6, looking in the direction indicated.

Fig. 8 is a fragmentary, sectional, plan view, taken on line 8—8 of Fig. 4, looking in the direction indicated.

Fig. 9 is a top, plan, sectional view, of one of the driving of the raising and lowering elements, adapted to being manipulated by one of the remote control rods.

Fig. 10 is a sectional, side elevation of a preferred form of embodiment of a form of adjustable and flexible support for the feed roll disposed at the outlet end of the machine.

Fig. 11 is a sectional view, taken on line 11—11 of Fig. 10, looking in the direction indicated.

Like reference characters refer to like parts throughout the several views.

Figure 12:
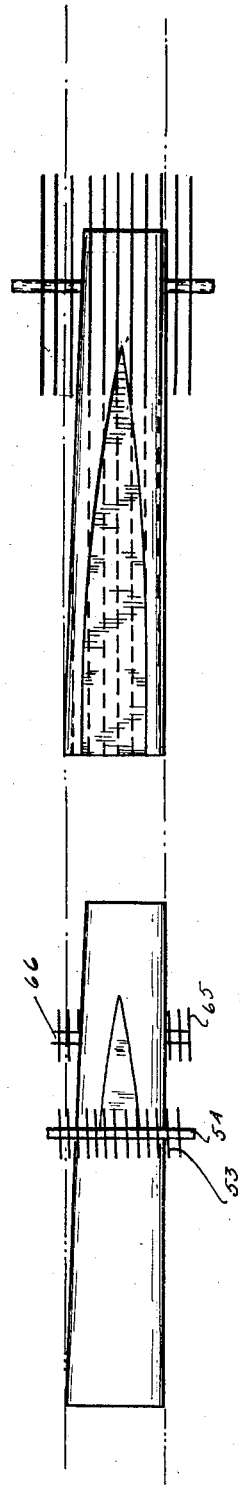
Fig. 12 is a top, plan view, of a diagrammatical lay-out of a preferred form of sawing logs by my new and improved device in combination with a standard gang edger.

I preferably form my device of two side frames 1 and 2, and form a cradle 3 in the receiving end of the frame. Logs to be sawn are deposited upon the moving platform 4, and are carried within the frame structure and are deposited from the element 4 into the cradle 3. A multiple of chains adapted to power manipulation run longitudinally of the entrance carriage; these chains are here illustrated as being three in number, the central chain 5 being somewhat lower than those disposed at either side, as 6 and 7; shoes are disposed upon the outside chains, as shown at 8 and 9, having inwardly sloping side walls to form a circular contour of the chain elements at the shoes, so that a log on entering the cradle support will have a tendency to being maintained securely therein; means being provided to move the chains at either side of the central chain in or out relative to that of the central chain to form a close fitting cradle for the logs to be carried therein, the object of which is to provide a cradle adapted to carry logs of varying diameters. To prevent the log when rolled into the cradle from rolling on out, I form the shoes 9 disposed upon the chain 7 which are made somewhat longer than the shoes 8 on the chain 6 as shown in Fig. 3.

Referring to Fig. 6, the sprockets about which the feed chains rotate are illustrated at 11, 12 and 13; 11 being the center sprocket and the side sprockets being illustrated at 12 and 13; each of the sprockets are adjustably mounted upon the shaft 14, and the sprockets 12 and 13 are adapted to lateral movement relative to the shaft, the same being mounted upon a spline 15, disposed within the shaft 14. These sprockets 12 and 13 have adjusting shoes 16 and 17, mounted upon the hubs of the sprockets 12 and 13, and adjusting blocks 18 and 19 and 20 are in engagement with the shoes, disposed upon each sprocket. The adjusting block 19 engages the underside of the shoe 21 and acts as a positioning block. The adjusting screw 22 has collars 23 and 24 disposed thereupon engaging opposite sides of each of the shoe 19 and since the adjusting block 19 is fixedly secured to the sleeve shaft 25 and the collars 23 and 24 are fixedly secured to the adjusting screw 22, the adjusting screw 22 is prevented from endwise movement, because of these collars. The adjusting blocks 18 and 20 are adapted to sliding engagement relative to the supporting sleeve shaft 25. Rotation is imparted to the adjusting screw 22 through the medium of the power driven shaft 26.

As the shaft 26 is rotated, the worm 27 disposed on the outer end of the shaft 26 is also rotated; the worm 27 meshes with the worm wheel 28 and drives the same. The worm wheel 28 is fixedly secured to the adjusting screw 22 and rotates the same. A right hand and a left hand thread 29 and 30 are disposed upon the adjusting screw 22 and are in threaded engagement with the hubs disposed upon the adjusting blocks 18 and 20 so that as the shaft 26 is rotated, in one direction, the sprockets 12 and 13 are moved outwardly from the central sprocket and when the same is driven in the opposite direction, the sprockets 12 and 13 are moved inwardly toward the central sprocket 11. The sleeve shaft 25 is slidably mounted upon the supporting shaft 31 that is positioned within the side frames 1 and 2 and is secured thereto by the lock nuts 32 and 33. An adjusting arm 34 is mounted upon the positioning screw 35 and the adjusting arm 34 is also secured to the sleeve shaft 25. The adjusting screw 35 is in threaded engagement with the hub 35A positioned upon the adjusting arm 34 and a lateral movement of the sleeve shaft 25 is imparted upon the rotation of adjusting screw 35, so that the entire chain may have a lateral movement imparted thereto, upon the spline within the shaft 14, as the sleeve shaft 25 is moved laterally relative to the supporting shaft 31; it is therefore possible through this chain of mechanism to move the side chains relative to that of the central chain, and it is also possible to move the entire chain in cradle assembly by the rotation of the adjusting screw 35 and the sleeve shaft 25 to which the connecting adjusting arm 34 is directly connected.

The cut to be made on the bottom side of the log is made parallel to the slope of the bottom side of the log and the diameter of the log to be cut, and the material to be cut from the log determines the depth of cut that it will be desired to make from the bottom side of the log. It is therefore desirable to move the cradle structure vertically in either direction to adapt the log to the cutting heads of the machine.

Referring to Fig. 4, these shafts carrying the sprockets upon which the cradle chains are mounted are each disposed within adjusting blocks 36 and 37. The adjusting blocks 36 and 37 are maintained in position and alignment by being manipulated within suitable guideways 36A and 37A, and the adjusting screws 38 and 39 are secured to the adjusting blocks 36 and 37. Mounted upon the adjusting screws 38 and 39 are worm wheels 40 and 41, the same are adapted to being driven by worms 42 and 43, and I have here shown these adjusting devices to be four in number, as illustrated in Fig. 8, so that a like movement is imparted to oppositely disposed ends of each of the shafts upon which the sprocket wheels are mounted. Power for the manipulating of each of these movements is secured by the rotation of the shaft 44, illustrated in Fig. 8. The shaft 44 in the small machines may be driven by hand manipulation, or the same may be adapted to power manipulation. Superposed at either side of the side frames are brackets 45, 46 and 47, as illustrated in Fig. 4. The log carried upon the cradle chains enters between the bracket 45 and passes under the floating driven feed roll 48. The feed roll 48 is mounted upon the shaft 49 and the shaft 49 is carried within the arms 50. The arms 50 being hingedly secured to the shaft 51. The adjustable stop 52 is positioned within the line of travel of the arms 50, and determines the limit of down position to which the feed roll 48 may swing. A cutter head 53, here shown as a series of wabble saws, is mounted upon the driven shaft 54, and the wabble saws are maintained upon the shaft 54 in spaced relationship, and power for driving the cutter head is applied through the pulley 55 disposed upon the outer end of the shaft 54. The shaft 54 and the cutter head disposed thereupon is rotated within suitable bearings mounted upon the bearing block 55a. The bearing block 55a is supported upon the adjusting block 56. The adjusting block 56 is disposed within suitable guideways within the adjusting head 57 by which the feed roll 48 and the associated mechanism and the cutter head 53 are carried. The adjusting block 56 is positioned through the medium of the adjusting screw 58, the object of which is to raise and lower the cutter head independently of the feed roll. Power for raising and lowering the head is applied to the worm wheel 59 disposed upon the lower end of the shaft 58, power being applied to the worm wheel through the worm 60. The worm 60 is secured to the shaft 61, and the shaft 61 has mounted upon the oppositely disposed end a worm 62, so that the adjusting block 56 may be raised and lowered from oppositely disposed sides of the machine, so that there is an adjusting head within the side frames on each side of the machine. Power for driving the worm wheel 59 and the worm wheel 63 is applied to the shaft 64 which has a worm 65A disposed upon its one end the same being adapted to actuate the worm wheel 63, which in turn drives the worm and the shaft 61; power may be applied to the shaft 64 by manual manipulation or by power means. Disposed in the line of travel of the log is a second cutting head 65, mounted upon the shaft 66. The shaft 66 is positioned within suitable bearings disposed upon the adjusting blocks 67 adapted to being raised and lowered within suitable guideways 68 and 69. The cutter head 65 is also preferably made of wabble saws, spaced upon the shaft 66 and is adapted to cut a predetermined amount of material from the underside of the log parallel to the slope of the log. The adjusting block 67 is positioned by being disposed upon the adjusting screw 70 which is in threaded relationship with the bracket or hub 71. The screw 70 may be turned relative to that of the hub or bracket 71 through the medium of a hand wrench applied to the adjusting nut 72 disposed upon the adjusting threaded shaft 70.

I have found that it is not necessary, in most instances, to adjust the cutter head 65 except to compensate for the wear in the cutter head itself. Cutter heads of the wabble saw type gives more uniform and better results than dado heads or other forms of cutters, because of the volume of material to be cut and because of the ease of replacement of the saws or of the entire cutter heads. The cut to be made on the underside of the log and upon the oppositely disposed side of the log are made parallel so that a log having two flattened sides that are parallel, or having one side flattened that is parallel to the slope of the log and having the oppositely disposed side that is partially flattened parallel to the oppositely disposed side gives a resultant cant that will produce a maximum amount of footage from the log. The further cutting of the resultant cant parallel with one side of the log will give a maximum amount of clear footage from the cant thus being further reduced to dimension lumber stock.

A second feed roll 73 is mounted within the frame and supported upon the bracket 47, the purpose of this feed roll is to carry the flattened cant from the feed chains through the machine and deliver the same to the next sawing operation.

Figure 13:
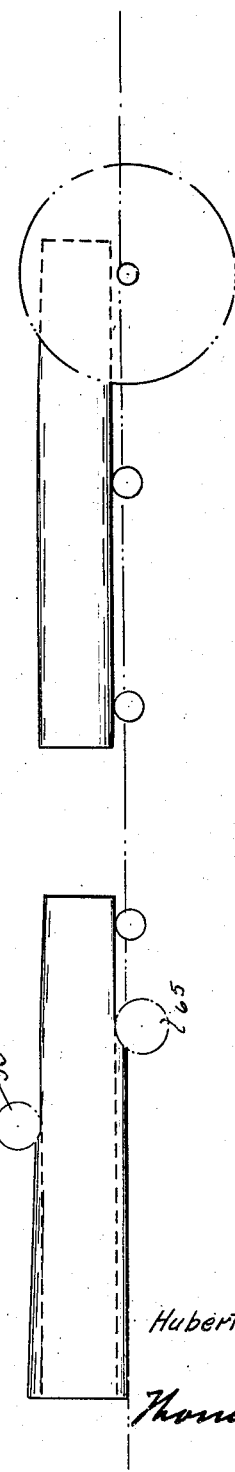
Fig. 13 is a side elevation of the mechanism illustrated in Fig. 12.

In Fig. 12 I have shown a most satisfactory sawing arrangement wherein the log is first fed through the new and improved sawing device and is then moved in a manner so that one edge of the resultant cant is parallel to the sawing line and the same is then fed through a gang edger and dimension material is cut from the cant, each strip of which is cut parallel to the slope of one side of the cant. In Fig. 12 I have shown the operation in plan view, while in Fig. 13 I have shown a side view of the mechanism illustrated in Fig. 12.

It is quite essential that the feed roll 73 that is mounted upon the supporting shaft 74 journaled within the bracket 75 be made flexible and adapted to a limited amount of movement due to a possibility of foreign matter becoming deposited upon the upper side of the log with which the feed roll 73 is made to engage. This is also essentially due to the fact that the feed roll is adapted to being raised and lowered by mechanical means. The bracket 75 is in suspended relationship relative to that of the adjusting screw 76, best illustrated in detail in Fig. 10 and in Fig. 11. The adjusting screw 76 is adapted to being rotated in either direction through the gear element 77 disposed upon the adjusting screw 76. The adjusting screw 76 passes through bosses 78 and 79 rearwardly extending from the bracket 75 and the screw is in threaded engagement with the screw block 80. In the normal action of the adjusting, the boss 79 of the bracket 75 rests upon the upper end of the screw block 80 and is normally maintained in that position due to the action of gravity and the compressible element, as a spring 81, that is disposed between the bracket 78 and the underside of the screw block 80. The compressible element 81, as a spring, encompasses the threaded adjusting screw. When the feed roller engages foreign matter of a noncompressible nature upon the upper side of the log or cant, the feed roller is raised and the compressible element is further compressed until the foreign matter encountered is passed at which time the feed roller will again be returned to normal position.

Referring to Fig. 1. The power for driving the machine is applied to the shaft 82 and to which shaft the bottom feed roll on the output end of the machine is also fastened, instead of a feed roll being adapted to the shaft 82, the treated log may be disposed upon a table 82A and passed therealong. A train of gearing connects the main driving shaft 82 and the shaft 83. A pulley 84 is disposed upon the shaft 83 and a driving element, as a belt connects the driving shaft 83 with the driven shaft 86 through the medium of the pulley 87. Two driving elements, as chains, or belts, are also secured to the shaft 86. The driving element 88 passes around the shaft 86 and is adapted to being driven thereby, the same also passes around the shrouded pulley 89 and is adapted to drive the same when the tightener pulley is actuated thereagainst. The tightener pulley 91 is normally idle and the tightener pulley is secured to the shaft 91A, which is illustrated in Fig. 1 and Fig. 4. The cradle chains run about sprockets disposed upon the shaft 14 and the shaft 14 and the cradle chains are driven when the idler pulley 91, illustrated in Fig. 1, is actuated against the driving element 88. The idler pulley 91 is carried upon a rockable arm 92 and is adapted to being actuated through the action of pull lever 93. The pull lever 93 has a hand engaging element 94 disposed upon the feed end of the machine, and has a series of notches 95 disposed in the end thereof that are adapted to engagement with the locking quadrant 96, so that when it is desired to feed the log into the machine the hand element 94 is manipulated. Disposed about the shaft 86 is a second driving element 97 that contacts with and actuates the driving pulley 98. The driven pulley is disposed upon the shaft 99, illustrated in Fig. 1, and a clutch engaging element is disposed upon the shaft 99, and is adapted to being actuated or manipulated through the clutch rod 100. The clutch rod 100 is adapted to being manipulated by the foot manipulating bell crank 101 and as the clutch rod 100 is actuated through the foot lever 101, the shaft upon which the gear 102 is operated is driven and in turn the shaft 103 is driven, because of the gear 104 disposed thereupon coacting with the gear 102. The shaft 103 drives the rollway chains upon which the log to be disposed within the cradle rests and the manipulation of these chains causes the log to be deposited within the cradle within the machine.

It is necessary to raise and lower the upper cutter heads and the feed rolls in order to adapt the machine and the various sizes of logs for cutting thereby. The driven shaft 105, disclosed in Fig. 1, is adapted to being driven in either direction through the action of a friction clutch adapted to engagement with cone frictions disposed adjacent thereto upon the driven shaft 105; the pull rod 106 is adapted to manipulate the clutch against either of these friction cones. The pull lever 106 is adapted to being manipulated by a hand lever 107 and is adapted to being held in normal or neutral position by the action of springs 108 and 109 disposed thereupon. When the lever is actuated in one direction, the driven shaft 105 will be driven in one direction, and when the hand lever is operated in the opposite direction the driven shaft will be operated in the opposite direction. The driven shaft 105, illustrated in Fig. 2, drives the cross shaft 110, and this in turn drives coacting gears for the driving of longitudinal shafts 110A and 110B. Mounted upon the shafts 110A and 110B are pinions that coact with gears mounted upon the shafts for raising and lowering head 57 and the feed roll 73. This also raises the adjusting block 56, and also the cutter head 53. The amount of raising and lowering of the feed chains and the cradle 3 is reflected by the indicator point 111, illustrated in Fig. 5, the same indicating the cut to be made from the underside of the log. A graduated bar 112 is secured to the frame of the machine and is intended to act as the indicator against which each of the pointers register to indicate the location of each of the elements to be indicated thereby. The graduated bar 112 has a zero mark 112A disposed thereupon which is adapted to indicate the starting or zero position, or the cutting line of the cutter head 65. The graduations disposed therebelow indicate the amount of graduations therebelow that a cut may be made to be taken from the bottom of the log.

The graduations disposed above this line indicate the amount of, or location of the various elements to be positioned as indicated. The pointer 111 is fixedly secured relative to that of the cradle and indicates the number of graduations that the cradle is disposed below the zero position upon the graduated bar 112. The pointer 113 is secured to the adjusting head 57 and indicates the position of the feed roll 48. The pointer 113A indicates the position of the cutting line of the cutter head 53. The indicators 118 positioned upon the shaft 119 each indicates the position of the cutting element disposed in the gang edger to which the log may be sent after leaving my new and improved saw mill. Each of these indicators are adapted to being positioned at any desired position relative to that of the shaft 119. It is also desirable to position the log so that one side of the log is parallel to the cutting element of the machine to which the log is to be delivered after the log has been passed through my new and improved device. This is accomplished by the manipulation of the lever 114 which is secured to the feed end of the shaft 115. The shaft 115 when rotated is adapted to manipulate the link 116 and to position the roller 117 and to move the log at one end of the cradle and deliver the same from my device in alignment with the cutting elements of the adjacent machine.

While the form of mechanism herein shown and described is admirably adapted to fulfill the objects primarily stated, it is to be understood that it is not intended to confine the invention to the one form of embodiment herein shown and described, as it is susceptible of embodiment in various forms, all coming within the scope of the claims which follow.

What I claim is:

1. In a device of the class described, the combination of a structural frame, a cradle disposed at the entrance end of the frame, chains disposed longitudinally of the bed of the cradle adapted to movement longitudinally of the frame, means for the lateral movement of the side chains relative to the center chain and means adapted to movement of the chains as a whole transversely of the frame, means for imparting a vertical movement to the cradle, and cutter heads and feed rolls disposed horizontally within the structural frame.

2. In a device of the class described, the combination of frame elements, a cradle disposed longitudinally of the frame and composed of endless chains, means for driving the chains, selective means for imparting lateral movement to the cradle as a whole and to certain individual chains thereof, means adapted to raise and lower the cradle relative to the frame, cutter heads and feed rolls disposed transversely of the frame and power means for imparting vertical movement to the cutter heads and to the feed rolls.

3. In a device of the class described, the combination of a frame, a cradle composed of endless chains running longitudinally of the feed end of the frame, selective means for imparting lateral movement to the cradle or to the side chains relative to the center chain, power means adapted to impart vertical movement to the cradle, horizontal cutter heads composed of wabble saws in spaced relation, feed rolls running transversely of the frame, means for imparting vertical movement to both the cutter heads and the feed rolls, and means for imparting a lateral movement of one end of the log while in the cradle.

4. In a device of the class described, the combination of a frame, a cradle disposed longitudinally of the feed end of the frame, means for preventing a log rolling into the cradle from rolling out thereof, means for adapting the contour of the bottom of the cradle to the contour of the log, means for vertically raising the cradle, the log and means for supplying longitudinal movement to the cradle and the log within the frame, cutter heads horizontally disposed transversely of the frame, power means for driving the cutter heads and for imparting vertical movement to the cutter heads, and feed rolls adapted to engage and feed the log longitudinally of the frame.

HUBERT C. MORRIS.